(12) United States Patent
Fujishiro

(10) Patent No.: US 11,523,329 B2
(45) Date of Patent: *Dec. 6, 2022

(54) RADIO TERMINAL AND BASE STATION

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 62 days.

This patent is subject to a terminal disclaimer.

(21) Appl. No.: 17/114,682

(22) Filed: Dec. 8, 2020

(65) Prior Publication Data

US 2021/0092670 A1 Mar. 25, 2021

Related U.S. Application Data

(63) Continuation of application No. 16/392,688, filed on Apr. 24, 2019, now Pat. No. 10,873,898, which is a (Continued)

(30) Foreign Application Priority Data

Nov. 4, 2016 (JP) .............................. JP2016-216661

(51) Int. Cl.
*H04W 48/10* (2009.01)
*H04W 72/00* (2009.01)
(Continued)

(52) U.S. Cl.
CPC ........... *H04W 48/10* (2013.01); *H04W 48/14* (2013.01); *H04W 72/005* (2013.01); *H04W 88/02* (2013.01); *H04W 88/08* (2013.01)

(58) Field of Classification Search
CPC ... H04W 48/10; H04W 48/14; H04W 72/005; H04W 88/02; H04W 88/08
See application file for complete search history.

(56) References Cited

U.S. PATENT DOCUMENTS

2015/0195755 A1* 7/2015 Gulati .............. H04W 36/0061
455/436
2016/0174135 A1 6/2016 Yan et al.
(Continued)

FOREIGN PATENT DOCUMENTS

JP 2012-186865 A 9/2012

OTHER PUBLICATIONS

Intel Corporation, System information for standalone NR deployment, 3GPP TSG-RAN WG2, Meeting #95bis, R2-166885, Oct. 10-14, 2016, pp. 1-5, Kaohsiung, Taiwan.
(Continued)

*Primary Examiner* — Mansour Oveissi
(74) *Attorney, Agent, or Firm* — Studebaker & Brackett PC

(57) ABSTRACT

A user equipment, apparatus and method receives a first system information block (SIB) that is broadcast from a first cell and includes information necessary for accessing the first cell, receives a second SIB other than the first SIB from the first cell in response to a request transmitted by the user equipment for the second SIB, receives and stores in memory area information from the first cell, the area information indicating a predetermined area comprising a plurality of cells including the first cell where the second SIB is applicable, and when the user equipment camps on a second cell, receives information from the second cell indicating an area that the second cell belongs to. A determination is made as to whether to transmit a request for the second SIB to the second cell at least based on the stored area information and the information received from the second cell.

3 Claims, 6 Drawing Sheets

Related U.S. Application Data continuation of application No. PCT/JP2017/039615, filed on Nov. 1, 2017.

(51) Int. Cl.
*H04W 48/14* (2009.01)
*H04W 88/02* (2009.01)
*H04W 88/08* (2009.01)

(56) References Cited

U.S. PATENT DOCUMENTS

2016/0234736 A1  8/2016  Kubota et al.
2019/0297542 A1  9/2019  Tang

OTHER PUBLICATIONS

Coolpad, Initial Views about On Demand SI Delivery for 5G NR, 3GPP TSG-RAN WG2, Meeting #95bis, R2-166603, Oct. 10-14, 2016, pp. 1-3, Kaohsiung, Taiwan.
Samsung, Nokia, Mediatek, Panasonic, Principle/Guideline: Minimum SI TX in Camping Cell, 3GPP TSG-RAN WG2, Meeting #95bis, R2-166393, Oct. 10-14, 2016, pp. 1-3, Kaohsiung, Taiwan.
Gemalto N.V., System Information for NR including ID and version tag, 3GPP TSG-RAN WG2, Meeting #95bis, R2-166132, Oct. 10-14, 2016, pp. 1-3, Kaohsiung, Taiwan.
Mediatek Inc., Stored System Information, 3GPP TSG-RAN2, Meeting #95bis, R2-166572, Oct. 10-14, 2016, pp. 1-4, Kaohsiung, Taiwan.
Ericsson, Index based provisioning of system information in NR, 3GPP TSG-RAN WG2, Meeting #95bis, R2-166772, Oct. 10-14, 2016, pp. 1-3, Kaohsiung, Taiwan.
Sharp, NR System Information Areas for Other SI, 3GPP TSG-RAN WG2, Meeting #95bis, R2-166353, Oct. 10-14, 2016, pp. 1-5, Kaohsiung, Taiwan.
Nokia, Alcatel-Lucent Shangahi Bell, Distribution of System Information in NR, 3GPP TSG-RAN WG2, Meeting #95bis, R2-167039, Oct. 10-14, 2016, pp. 1-5, Kaohsiung, Taiwan.
ITRI, Including cell reselection information in the Minimum SI, 3GPP TSG-RAN WG2, Meeting #95bis, R2-166484, Oct. 10-14, 2016, pp. 1-6, Kaohsiung, Taiwan.
Institute for Information Industry (III); "Discussion on System Information Acquisition"; 3GPP TSG-RAN WG2 Meeting#95; Aug. 22-26, 2016; total 4 pages; Gothenburg, Sweden.
Samsung; "Report of email discussion on [94#40][NR] System information"; 3GPP TSG-RAN WG2 95; R2-165201; Aug. 22-26, 2016; total 32 pages; Gothenburg, Sweden.
Samsung; "Contents of Minimum System Information"; 3GPP TSG-RAN WG2 Meeting #95bis; R2-166493 (Update of R2-165200); Oct. 10-14, 2016; total 5 pages; Kaohsiung, Taiwan.
Huawei, HiSilicon; "Delivery of "Other SI" in NR"; 3GPP TSG-RAN2 Meeting #95bis; R2-166203; Oct. 10-14, 2016; total 6 pages; Kaohsiung, Taiwan.
Interdigital Communications, "System Information Acquisition for New Radio Access", 3GPP TSG-RAN WG2 #95-BIS, R2-166867, Oct. 10-14, 2016, 3 pages, Kaohsiung, Taiwan.

\* cited by examiner

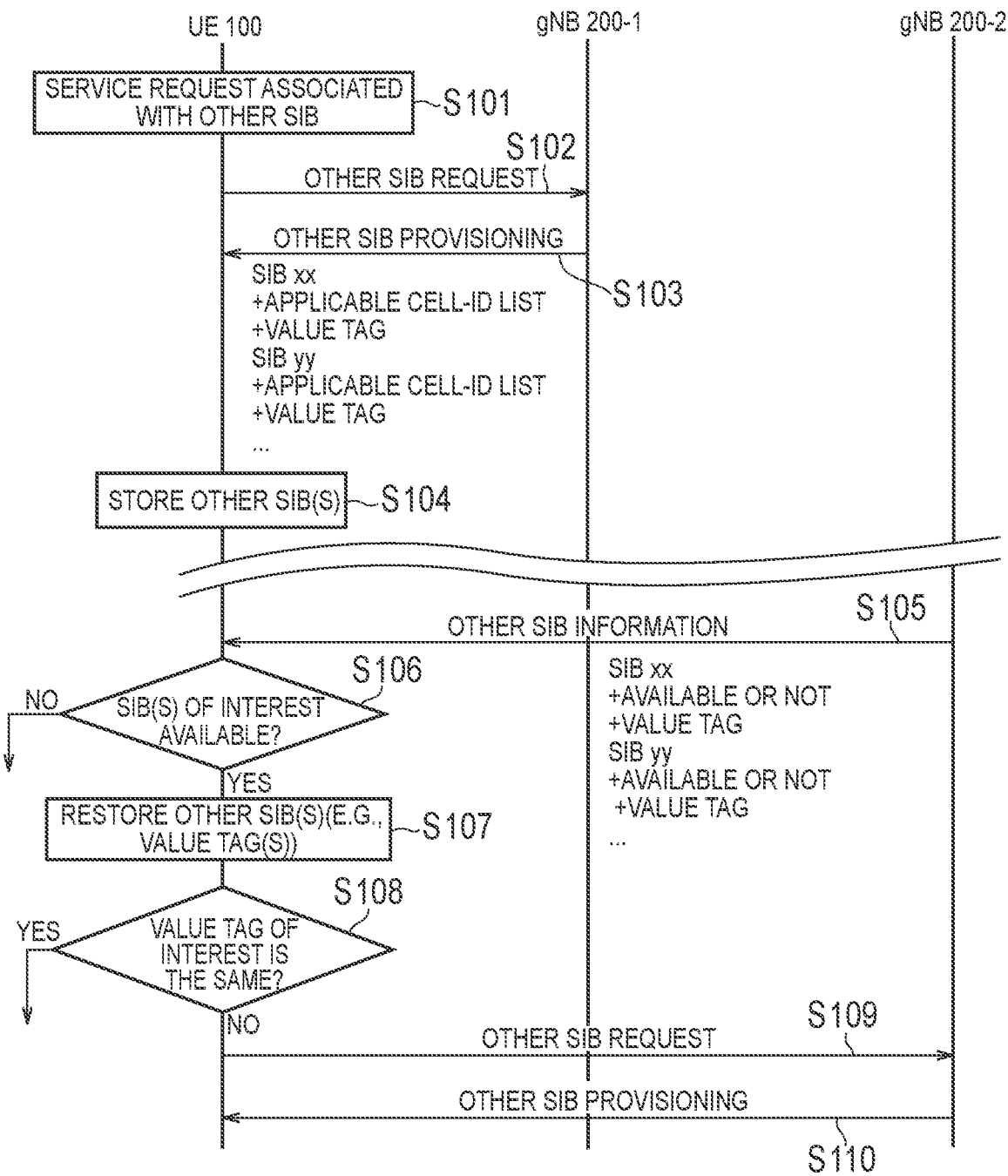

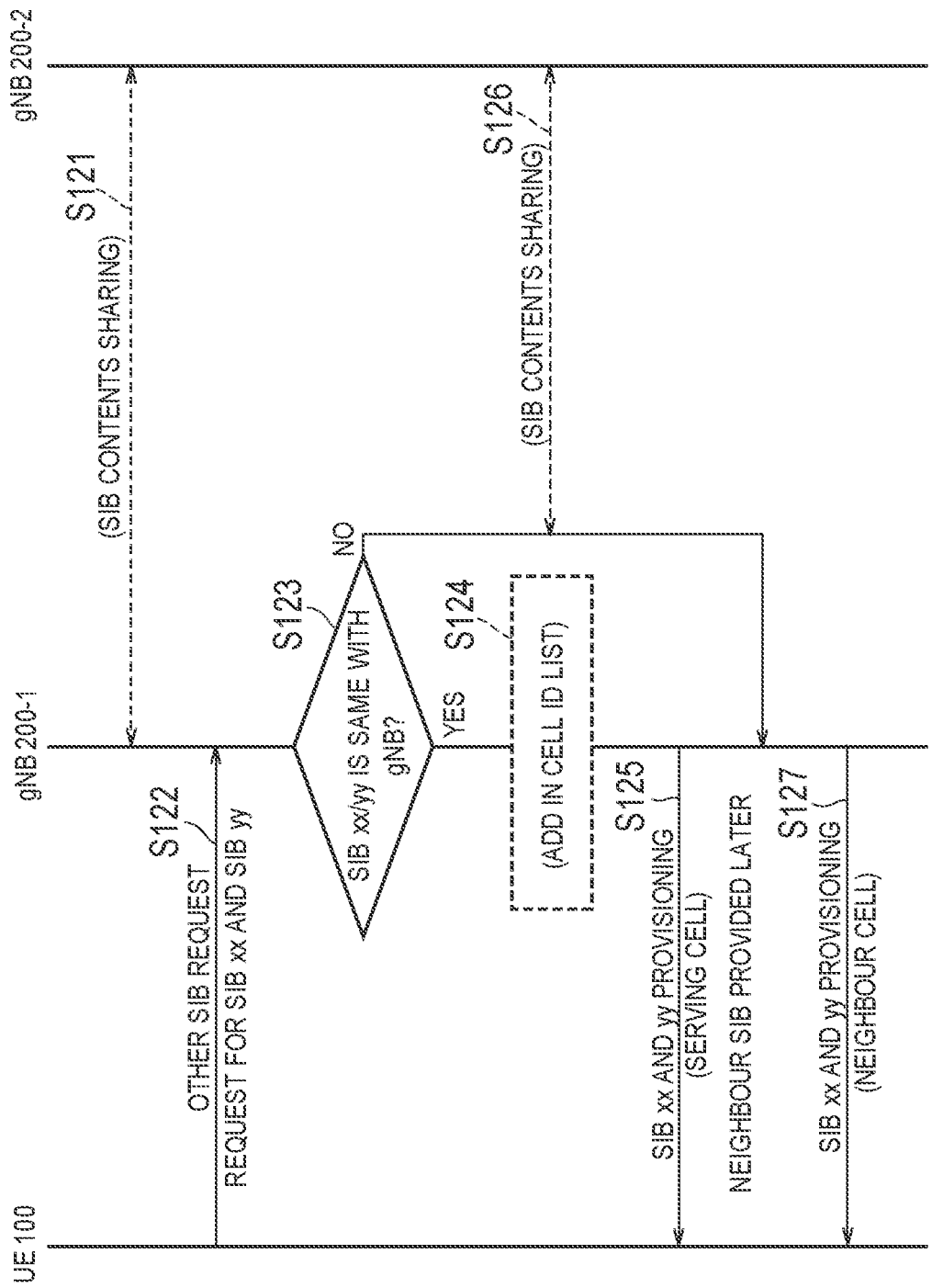

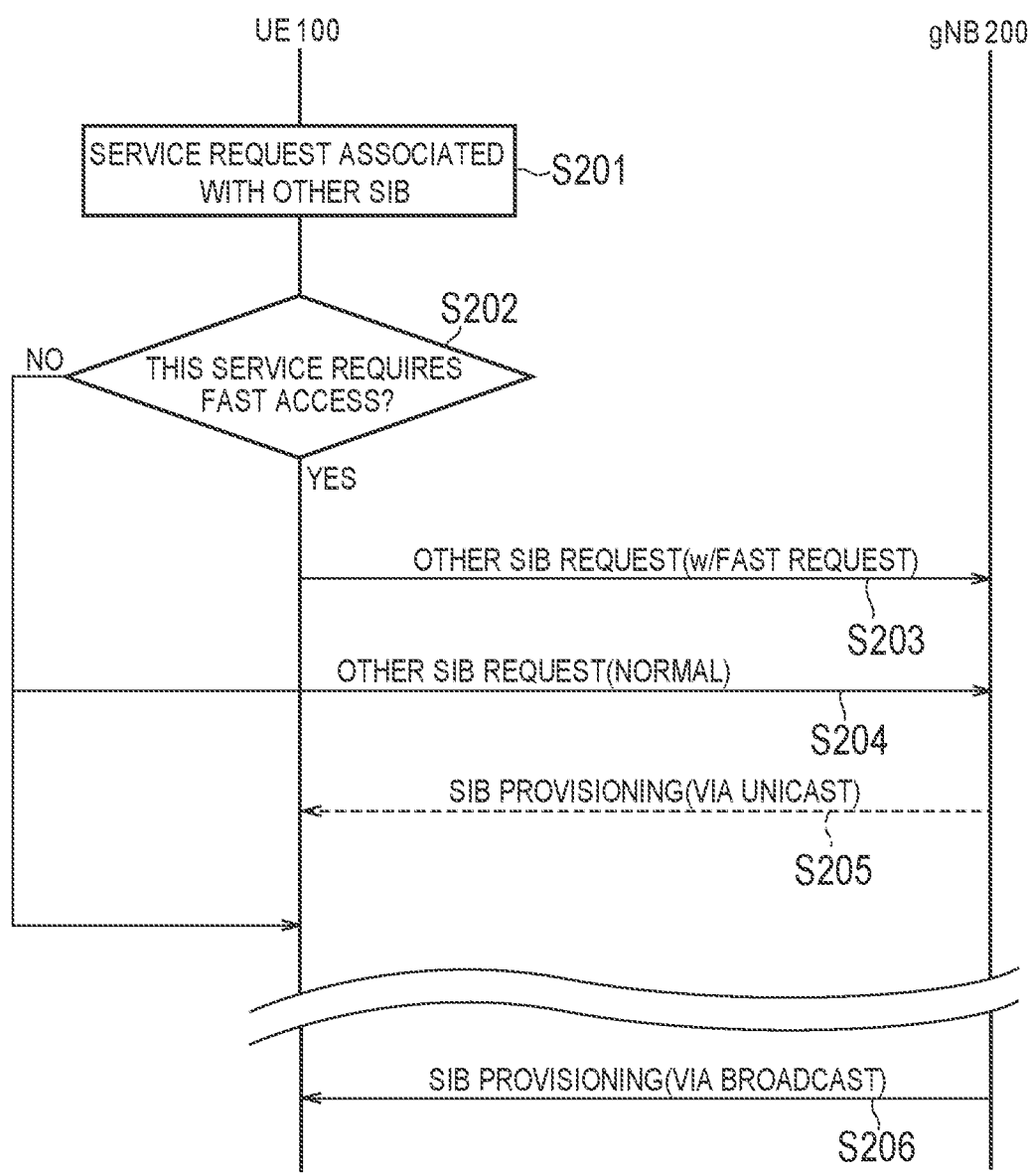

RADIO TERMINAL AND BASE STATION

CROSS-REFERENCE TO RELATED APPLICATIONS

This application is a Continuation Application of U.S. patent application Ser. No. 16/392,688 filed Apr. 24, 2019, which is a Continuation Application of International Application No. PCT/JP2017/039615, filed Nov. 1, 2017, which claims the benefit of Japanese Patent Application No. 2016-216661, filed on Nov. 4, 2016, the entire contents of which are incorporated herein by reference.

TECHNICAL FIELD

The present disclosure relates to a radio terminal and a base station for a mobile communication system.

BACKGROUND ART

In recent years, research on new radio access technology (NR) for the 5th generation (5G) mobile communication system has been progressing in the Third Generation Partnership Project (3GPP) that is a mobile communication system standardization project.

In the conventional long term evolution (LTE), a base station periodically broadcasts all system information. However, broadcasting system information irrespective of whether or not the system information is actually used for a radio terminal has a problem that the power and the like of a radio resource and the base station are wastefully consumed.

Thereupon, for the NR, technology for efficiently providing system information (SI) to a radio terminal is being studied. Such technology classifies the system information into minimum system information (minimum SI) and other system information (other SI). The base station periodically broadcasts the minimum system information and provides the other system information on demand in response to a request from a radio terminal.

SUMMARY

A user equipment according to the present disclosure comprises a processor and a memory. The processor configured to receive a first system information block (SIB) that is broadcast from a first cell and includes information necessary for accessing the first cell, receive a second SIB other than the first SIB from the first cell in response to a request transmitted by the user equipment for the second SIB, receive and store in the memory area information from the first cell, the area information indicating a predetermined area where the second SIB is applicable, the predetermined area comprising a plurality of cells including the first cell, and when the user equipment camps on a second cell, receive information from the second cell indicating an area that the second cell belongs to. The processor is configured to determine whether to transmit a request for the second SIB to the second cell at least based on the stored area information and the information received from the second cell.

An apparatus for controlling a user equipment according to the present disclosure comprises a processor and a memory. The processor configured to receive a first system information block (SIB) that is broadcast from a first cell and includes information necessary for accessing the first cell, receive a second SIB other than the first SIB from the first cell in response to a request transmitted by the user equipment for the second SIB, receive and store in the memory area information from the first cell, the area information indicating a predetermined area where the second SIB is applicable, the predetermined area comprising a plurality of cells including the first cell, and when the user equipment camps on a second cell, receive information from the second cell indicating an area that the second cell belongs to. The processor is configured to determine whether to transmit a request for the second SIB to the second cell at least based on the stored area information and the information received from the second cell.

A method used in a user equipment according to the present disclosure comprises receiving a first system information block (SIB) that is broadcast from a first cell and includes information necessary for accessing the first cell, receiving a second SIB other than the first SIB from the first cell in response to a request transmitted by the user equipment for the second SIB, receiving and storing in memory area information from the first cell, the area information indicating a predetermined area where the second SIB is applicable, the predetermined area comprising a plurality of cells including the first cell, and when the user equipment camps on a second cell, receiving information from the second cell indicating an area that the second cell belongs to. The method comprises determining whether to transmit a request for the second SIB to the second cell at least based on the stored area information and the information received from the second cell.

BRIEF DESCRIPTION OF DRAWINGS

FIG. 5 is a diagram illustrating one example of an operating sequence according to the first embodiment.

FIG. 6 is a diagram illustrating one example of an operating sequence of the modification example 1 of the first embodiment.

FIG. 7 is a diagram illustrating one example of an operating sequence according to the second embodiment.

DESCRIPTION OF EMBODIMENTS

System information other than minimum system information (hereinafter referred to as "on-demand system information") may differ for each cell. Thus, each time a radio terminal moves from one cell to another cell, the radio terminal may request the destination cell to provide the on-demand system information. A base station may provide the on-demand system information by broadcast. Therefore, introducing the provision of the on-demand system information has a concern that the efficiency and/or immediacy of providing the system information may rather decline.

(1) First Embodiment

A first embodiment will be described. A mobile communication system according to the first embodiment is a 5G mobile communication system based on 3GPP standards.

(1.1) Mobile Communication System

Figure 1:
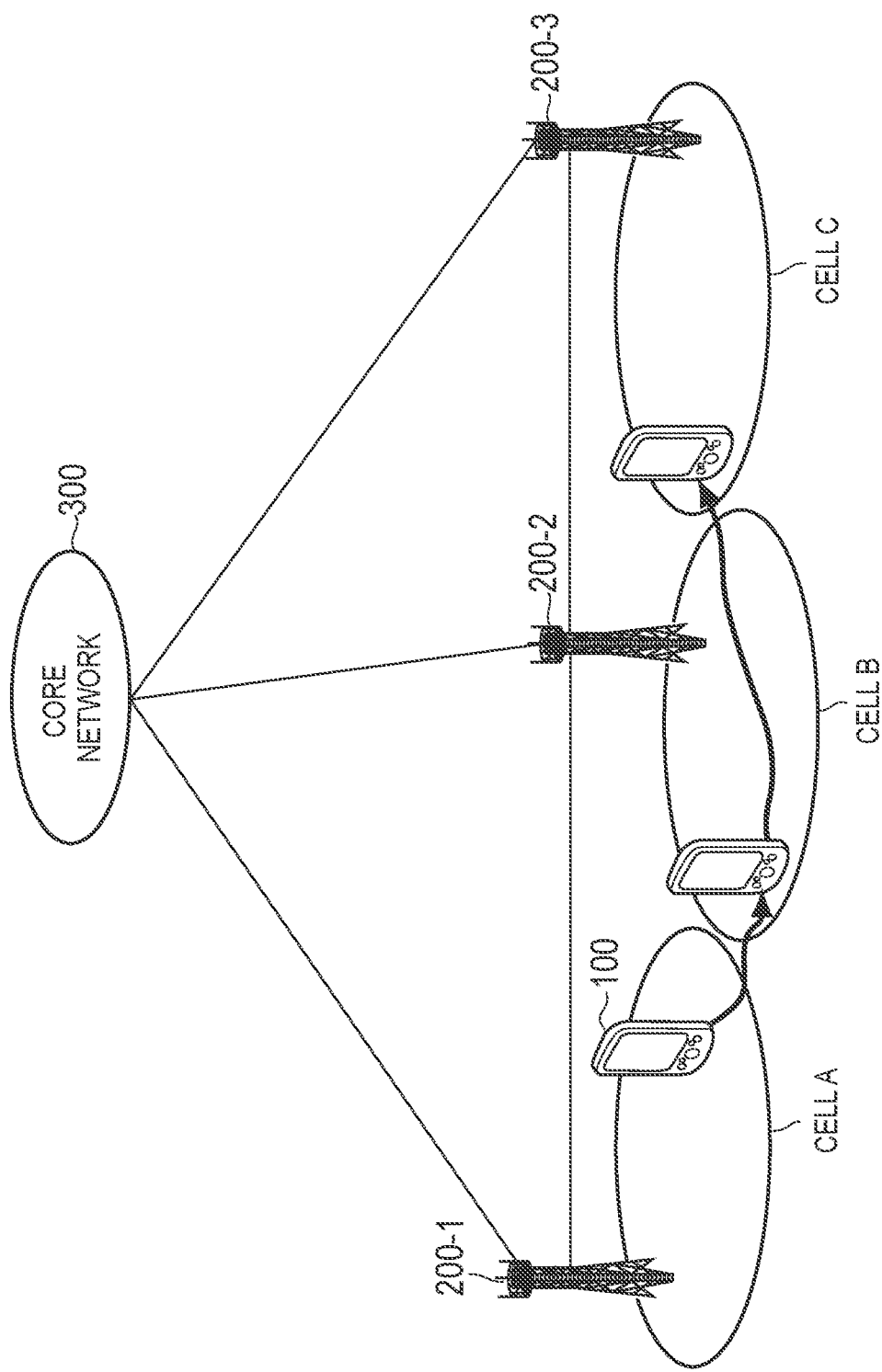
FIG. 1 is a diagram illustrating a mobile communication system according to first and second embodiments.

FIG. 1 is a diagram illustrating the mobile communication system. As illustrated in FIG. 1, the mobile communication system has a radio terminal (user equipment: UE) 100, a plurality of base stations 200 (base stations 200-1 to 200-3), and a core network (CN) 300.

The UE 100 is a mobile communication apparatus. The UE 100 performs radio communication with the gNB 200 that manages the cell (serving cell) in which the UE 100 exists.

The plurality of base stations 200 constitute a radio access network (RAN). Each base station 200 manages one or a plurality of cells. Each base station 200 performs radio communication with the radio terminal 100 that has established connection with its own cell. The "cell" is used as a term indicating the minimum unit of a radio communication area. The "cell" may also be used as a term indicating a function or a resource for performing radio communication with the radio terminal 100. The base stations of the 5G mobile communication system are referred to as next Generation Node-Bs (gNBs). An inter-base station interface is provided between one gNB and another gNB. Each gNB communicates with another gNB via the inter-base station interface.

The CN 300 performs mobility management, transfer control of user data and the like of the UE 100. A RAN-CN interface is provided between CN 300 and each gNB 200. The CN 300 communicates with each gNB 200 via the RAN-CN interface.

In the example illustrated in FIG. 1, the gNB 200-1 manages a cell A. The gNB 200-2 manages a cell B. The gNB 200-3 manages a cell C. Each gNB 200 may further manage one or more beams (not illustrated). Each gNB 200 provides system information to the UE 100 existing in its own cell. The UE 100 moves to the cell A, the cell B and the cell C in order.

In the first embodiment, in order to efficiently provide the system information to the radio terminal, the system information is classified into minimum system information (first system information) and other system information (second system information). Each gNB 200 periodically broadcasts the minimum system information and provides on-demand system information which is the other system information in response to the request from the UE 100 on demand Hereinafter, the system information is expressed as a system information block (SIB).

The minimum SIB broadcast by the cell includes information necessary for the UE 100 to access the cell. Such information includes, for example, establishment information on a physical random access channel, and the like. The minimum SIB may include information necessary for the UE 100 to acquire the on-demand SIB (e.g., scheduling information and the like). The minimum SIB may include configuration information on a request signal requesting the provision of the on-demand SIB. The minimum SIB may be referred to as an essential SIB.

The on-demand SIB includes an SIB (other IS) other than the minimum SIB. Such an SIB may be an SIB for an individual function (individual service). As one example, the on-demand SIB includes an SIB for device-to-device (D2D) communication, an SIB for broadcast/multicast communication, an SIB for a public warning system (PWS), and the like. These SIBs may be uniquely identifiable by the identifiers of the SIBs. The on-demand SIBs may be referred to as arbitrary SIBs.

Figure 2:
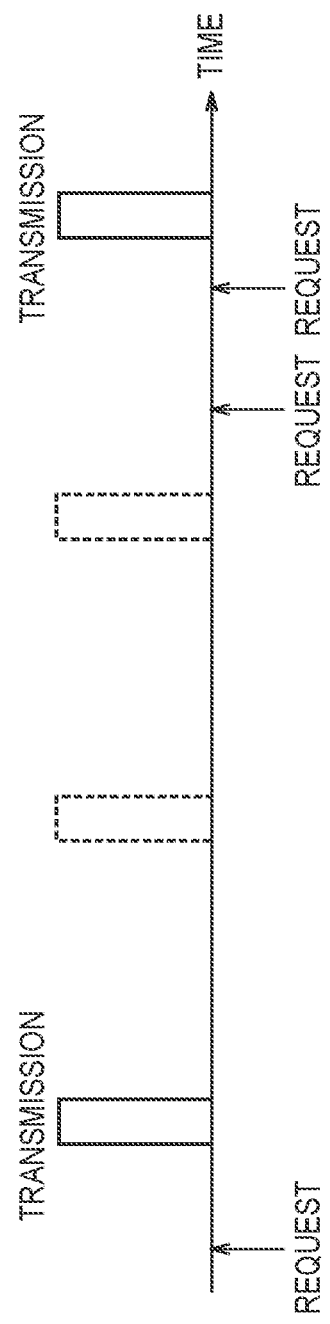
FIG. 2 is a diagram illustrating one example of on-demand SIBs (on-demand system information) provided by broadcast.

The on-demand SIB is provided by broadcast or unicast. FIG. 2 is a diagram illustrating one example of on-demand SIBs provided by broadcast. As illustrated in FIG. 2, transmission opportunities of the on-demand SIBs are periodically set. When the gNB 200 has received a request from the UE 100, the gNB 200 broadcasts the on-demand SIB at a transmission opportunity after the request. When the gNB 200 does not receive a request from the UE 100 between one transmission opportunity and the next transmission opportunity, the gNB 200 does not transmit the on-demand SIB at the next transmission opportunity. Accordingly, it is possible to save power and the like of a radio resource and the base stations.

(1.2) Radio Terminal

Figure 3:
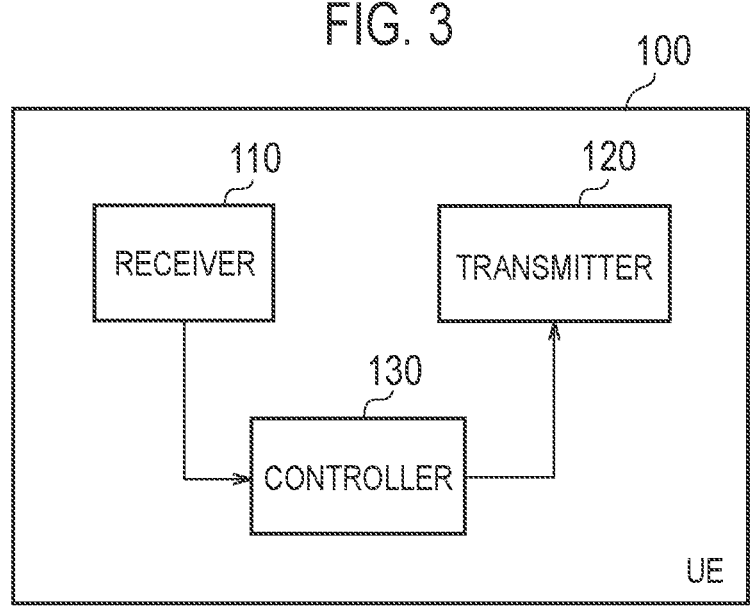
FIG. 3 is a diagram illustrating the UE (radio terminal) according to the first and second embodiments.

FIG. 3 is a diagram illustrating the UE 100. As illustrated in FIG. 3, the UE 100 has a receiver 110, a transmitter 120 and a controller 130. The receiver 110 performs various types of reception under the control of the controller 130. The receiver 110 includes an antenna and a receiving device. The receiving device converts a radio signal received by the antenna into a baseband signal (received signal) and outputs the signal to the controller 130. The transmitter 120 performs various types of transmission under the control of the controller 130. The transmitter 120 includes an antenna and a transmitting device. The transmitting device converts a baseband signal (transmitting signal) outputted by the controller 130 into a radio signal and transmits the signal from the antenna. The controller 130 performs various types of control in the UE 100. The controller 130 includes a processor and a memory. The memory stores programs executed by the processor and information used for processing by the processor. The processor includes a baseband processor and a central processing unit (PU). The baseband processor performs modulation/demodulation, encoding/decoding, and the like of the baseband signal. The CPU executes programs stored in the memory and performs various types of processing. The processor may include a codec for encoding/decoding an audio/video signal. The processor executes various types of processing described later.

In the first embodiment, the receiver 110 receives the minimum SIB from the gNB 200 (serving cell). The controller 130 acquires the on-demand SIB from the gNB 200 (serving cell) by making a request to the gNB 200. The controller 130 acquires area information, which indicates an area in which the UE 100 can apply the on-demand SIB, together with the on-demand SIB from the gNB 200 (serving cell). In the first embodiment, the area information is included in the on-demand SIB.

In the first embodiment, an area (hereinafter referred to as an "applicable area") in which the UE 100 can apply the on-demand SIB is constituted by a plurality of cells including a current serving cell. The area information includes a list (cell identifier list) of identifiers of the plurality of cells. Moreover, the applicable area may be constituted by a plurality of beams including a serving beam, and a beam identifier may be allocated to each beam. The beam identifier may be included in the cell identifier list.

In the first embodiment, the controller 130 determines whether or not the UE 100 has moved to another cell outside the applicable area. As one example, the controller 130 detects the cell identifier of the cell for each destination cell of the UE 100, confirms whether or not the detected cell identifier matches any cell identifier in the cell identifier list, and determines that the destination cell is outside the applicable area when the cell identifiers do not match. In response to that the UE 100 has been determined to be moved to another cell outside the applicable area, the controller 130 may request another cell to provide the on-demand SIB of another cell.

In the first embodiment, the controller 130 may acquire, from the gNB 200 (serving cell), a tag number associated with the on-demand SIB. Based on the acquired tag number, the controller 130 may determine whether or not an on-demand SIB after being updated is provided from another cell in the applicable area, and acquire the on-demand SIB after being updated from another cell in response to that the on-demand SIB after being updated has been determined to be provided from another cell.

(1.3) Base Station

Figure 4:
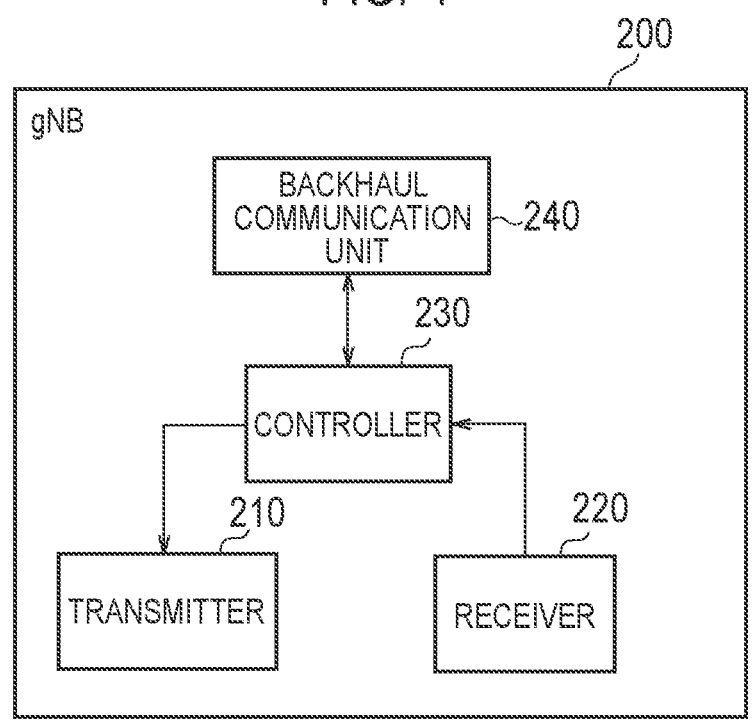
FIG. 4 is a diagram illustrating the gNB (base station) according to the first and second embodiments.

FIG. 4 is a diagram illustrating the gNB 200. As illustrated in FIG. 4, the gNB 200 has a transmitter 210, a receiver 220 and a controller 230. The gNB 200 may have a backhaul communication unit 240. The transmitter 210 performs various types of transmission under the control of the controller 230. The transmitter 210 includes an antenna and a transmitting device. The transmitting device converts a baseband signal (transmitting signal) outputted by the controller 230 into a radio signal and transmits the signal from the antenna. The receiver 220 performs various types of reception under the control of the controller 230. The receiver 220 includes an antenna and a receiving device. The receiving device converts a radio signal received by the antenna into a baseband signal (received signal) and outputs the signal to the controller 230. The controller 230 performs various types of control in the gNB 200. The controller 230 includes a processor and a memory. The memory stores programs executed by the processor and information used for processing by the processor. The processor includes a baseband processor and a CPU. When the baseband processor performs modulation/demodulation, encoding/decoding, and the like of the baseband signal, the CPU executes programs stored in the memory and performs various types of processing. The processor executes various types of processing described above and various types of processing described later. The backhaul communication unit 240 is connected to the CN 300 via the RAN-CN interface. The backhaul communication unit 240 may be connected to a neighbor base station (not illustrated) via the inter-base station interface. Part of the functions of the controller 230, the transmitter 210 and the receiver 220 may be arranged in a separate unit. In this case, the separate unit and the gNB 200 are interconnected by fronthaul communication.

In the first embodiment, the transmitter 210 periodically broadcasts the minimum SIB including information necessary for the UE 100 to access its own cell. The controller 230 provides the UE 100 with the on-demand SIB including the SIB other than the minimum SIB in response to a request from the UE 100. The controller 230 provides the UE 100 with area information, which indicates an applicable area in which the UE 100 can apply the on-demand SIB, together with the on-demand SIB.

In the first embodiment, the minimum SIB transmitted by the transmitter 210 may include at least one of information indicating whether or not the gNB 200 provides a specific SIB other than the minimum SIB or a tag number associated with the specific SIB.

(1.4) Operating Sequence

FIG. 5 is a diagram illustrating one example of an operating sequence according to the first embodiment. In the following description of the drawings, the on-demand SIB is expressed as the "Other SIB." Herein, a scenario is presumed where the UE 100 receives the on-demand SIB in the cell A of the gNB 200-1 and then moves to the cell B of the gNB 200-2. However, it is possible to presume a scenario where the cell A and the cell B are not managed by different gNBs but the cell A and the cell B are managed by the same gNB.

As illustrated in FIG. 5, in Step S101, the UE 100 detects that it is necessary to acquire the on-demand SIB (Other SIB). As one example, the UE 100 detects that its upper layer (e.g., an application layer or the like) requests use of a specific service. The specific service is a service related to the on-demand SIB (Other SIB).

In Step S102, in response to the occurrence of the necessity to acquire the on-demand SIB (Other SIB), the UE 100 transmits, to the gNB 200-1, a request signal (Other SIB request) requesting the provision of the on-demand SIB (Other SIB). The request signal (Other SIB request) may include the identifier of the SIB that the UE 100 requests to provide.

In Step S103, the gNB 200-1 provides the on-demand SIB (Other SIB) to the UE 100 in response to the reception of the request signal (Other SIB request). The gNB 200-1 provides the on-demand SIB (Other SIB) by broadcast or unicast. The gNB 200-1 may provide the on-demand SIB (Other SIB) including the SIB (i.e., the SIB requested by the UE 100) corresponding to the identifier included in the request signal (Other SIB request). The gNB 200-1 may provide the on-demand SIB (Other SIB) including all available SIBs other than the minimum SIB.

The gNB 200-1 provides a list of applicable cell identifiers (Applicable Cell-ID list), to which the on-demand SIB (Other SIB) can be applied, together with the on-demand SIB (Other SIB). The list (Applicable Cell-ID list) may be provided for each SIB in the on-demand SIB (Other SIB). As one example, a list (Applicable Cell-ID list) corresponding to SIBxx and a list (Applicable Cell-ID list) corresponding to SIByy are provided.

The gNB 200-1 may provide a tag number (Value Tag), which is associated with the on-demand SIB (Other SIB), together with the on-demand SIB (Other SIB). The tag number (Value Tag) is a number that is updated according to the updating of the corresponding SIB. The tag number (Value Tag) may be provided for each SIB in the on-demand SIB (Other SIB). As one example, the tag number (Value Tag) corresponding to SIBxx and the tag number (Value Tag) corresponding to SIByy are provided.

In Step S104, the UE 100 stores the on-demand SIB (Other SIB) provided from the gNB 200-1. The on-demand SIB (Other SIB) may include a plurality of SIBs. The UE 100 utilizes a specific service (or a specific function) by using the stored on-demand SIB.

Thereafter, the UE 100 moves from the cell A of the gNB 200-1 to the cell B of the gNB 200-2.

In Step S105, the gNB 200-2 broadcasts the minimum SIB. The minimum SIB may include the cell identifier of the cell B. The minimum SIB may include information (Other SIB Information) on the on-demand SIB (Other SIB). The information (Other SIB Information) includes at least one of information indicating whether or not the gNB 200-2 provides the on-demand SIB (Available or not) or the tag number (Value Tag) associated with the on-demand SIB (Other SIB). The information (Other SIB Information) may be provided for each SIB in the on-demand SIB (Other SIB). As one example, the information (Available or not) and tag number (Value Tag) corresponding to SIBxx and the information (Available or not) and tag number (Value Tag) corresponding to SIByy are provided. The UE 100 receives the minimum SIB from the gNB 200-2. The information (Other SIB Information) may be included in information or a message other than the minimum SIB.

In Step S106, the UE 100 determines whether or not the stored on-demand SIB (Other SIB) is available in the cell B. Specifically, the UE 100 compares the cell identifier of the cell B with the cell identifier in each stored list (Applicable Cell-ID list) and determines whether or not the cell identifiers match. Herein, a description will be given of a case where the cell identifiers are presumed to match (Step S106: Yes).

When the cell identifier of the cell B does not match the cell identifier in any lists (Applicable Cell-ID list) (Step S106: No), the UE 100 may determine, based on the information (Available or not) received in the cell B, whether or not the on-demand SIB (Other SIB) corresponding to the list is provided in the cell B. When the UE 100 has determined that the on-demand SIB (Other SIB) is provided in the cell B, the UE 100 may request the gNB 200-2 (cell B) to provide the on-demand SIB (Other SIB).

In Step S107, the UE 100 reads out the information on the stored on-demand SIB (Other SIB), for example, the tag number (Value Tag).

In Step S108, the UE 100 compares the readout tag number (Value Tag) with the tag number (Value Tag) received in the cell B and determines whether or not the tag numbers match. When the tag numbers match (Step S108: Yes), the UE 100 determines that the on-demand SIB (Other SIB) acquired in the cell A can be used in the cell B.

When the tag numbers do not match (Step S108: No), in Step S109, the UE 100 transmits, to the gNB 200-2 (cell B), the request signal (Other SIB request) requesting the provision of the on-demand SIB (Other SIB). The request signal (Other SIB request) may include the identifier of the SIB that the UE 100 requests to provide.

In Step S110, the gNB 200-2 provides the on-demand SIB (Other SIB) to the UE 100 in response to the reception of the request signal (Other SIB request). The gNB 200-2 provides the on-demand SIB (Other SIB) by broadcast or unicast. The gNB 200-2 may provide the on-demand SIB (Other SIB) including the SIB corresponding to the identifier included in the request signal (Other SIB request). The gNB 200-2 may provide the on-demand SIB (Other SIB) including all available SIBs other than the minimum SIB.

(1.5) Modification Example 1

In a modification example 1 of the first embodiment, a gNB 200 (controller 230) provides a UE 100 with an on-demand SIB provided by another cell (e.g., a neighbor cell) outside an applicable area of the on-demand SIB. Hereinafter, the on-demand SIB provided by another cell is referred to as a "neighbor cell on-demand SIB." The UE 100 (controller 130) acquires the neighbor cell on-demand SIB from the gNB 200.

The gNB 200 (controller 230) may acquire the neighbor cell on-demand SIB from a gNB, which manages another cell, via an inter-base station interface. The neighbor cell on-demand SIB provided to the UE 100 may include the cell identifier of another cell.

The gNB 200 (controller 230) may provide the UE 100 with the neighbor cell on-demand SIB at the same time as the provision of the on-demand SIB of its own cell, or may provide the UE 100 with the neighbor cell on-demand SIB at a timing different from the provision of the on-demand SIB of its own cell. When the neighbor cell on-demand SIB is provided is at a different timing, the gNB 200 may notify the UE 100 of that effect.

FIG. 6 is a diagram illustrating one example of an operating sequence of the modification example 1 of the first embodiment. Processings indicated by broken lines in FIG. 6 are processings not essential. FIG. 6 presumes a scenario where a cell B of a gNB 200-2 is a neighbor cell of a cell A of a gNB 200-1.

As illustrated in FIG. 6, in Step S121, the gNB 200-1 and the gNB 200-2 may notify each other of the on-demand SIBs (Other SIBs), which are possessed by themselves, on the inter-base station interface.

In Step S122, the UE 100 transmits, to the gNB 200-1, a request signal (Other SIB request) requesting the provision of the on-demand SIB. The UE 100 may be allowed to transmit a request signal requesting the provision of the neighbor cell on-demand SIB only when a value indicating the moving speed of the UE 100 (e.g., the number of times of inter-cell movement within a unit time) exceeds a threshold value. In this case, the threshold value may be configured to the UE 100 from the gNB 200-1.

The request signal (Other SIB request) may include an identifier requesting the provision of the neighbor cell on-demand SIB. The request signal (Other SIB request) may include the identifier of another cell (neighbor cell) requesting the provision of the neighbor cell on-demand SIB. The request signal (Other SIB request) may include the identifier of the SIB requested to be provided. The request signal requesting the provision of the neighbor cell on-demand SIB may be a signal (a different message, a different preamble, or the like) different from the request signal requesting the provision of the on-demand SIB of the serving cell.

In Step S123, the gNB 200-1 determines whether or not the contents of the on-demand SIBs (e.g., SIBxx and SIByy) requested from the UE 100 are the same for the gNB 200-1 and the gNB 200-2.

When the gNB 200-1 has determined that the contents are the same (Step S123: Yes), the gNB 200-1 may add the cell identifier of the cell B of the gNB 200-2 to an applicable cell identifier list of the on-demand SIB (Other SIB) in Step S124. In Step S125, the gNB 200-1 provides the on-demand SIB (Other SIB) of its own cell (cell A) to the UE 100. The gNB 200-1 may provide the UE 100 with the on-demand SIB (Other SIB) including the SIBs (e.g., SIBxx and SIByy) requested, from the UE 100, to be provided.

On the other hand, when the gNB 200-1 has determined that the contents are different (Step S123: No), the gNB 200-1 may acquire the on-demand SIB (Other SIB) possessed by the gNB 200-2 from the gNB 200-2 on the inter-base station interface in Step S126. Then, in Step S127, the gNB 200-1 provides the UE 100 with the neighbor cell on-demand SIB. The neighbor cell on-demand SIB may include the ID of the neighbor cell or information (e.g., a flag, a message type, or the like) indicating that the cell is the neighbor cell.

In this sequence, the request signal requesting the provision of the neighbor cell on-demand SIB may be unnecessary. In other words, the gNB 200-1 may provide the UE 100 with the neighbor cell on-demand SIB in response to the reception of the request signal requesting the provision of the on-demand SIB of its own cell (cell A). The gNB 200-1 may provide the UE 100 with the neighbor cell on-demand SIB only when the UE 100 has been determined to be moving.

In the modification example 1 of the first embodiment, the gNB 200-1 may provide the UE 100 with a minimum SIB of another cell (neighbor cell) in addition to the neighbor cell on-demand SIB or instead of the neighbor cell on-demand SIB.

(1.6) Modification Example 2

In the above-described modification example 1 of the first embodiment, one example has been described where one gNB notifies another gNB of the on-demand SIB of the one gNB on the inter-base station interface in response to a request from another gNB.

However, even if there is no request from another gNB (gNB X), one gNB (gNB A) may notify another gNB (gNB X) of the on-demand SIB of the one gNB (gNB A) on the inter-base station interface.

As one example, one gNB (gNB A) may regularly notify another gNB (gNB X) of the on-demand SIB of the one gNB (gNB A) on the inter-base station interface. Updating the on-demand SIB of one gNB (gNB A) may trigger the one gNB (gNB A) to notify another gNB (gNB X) of the on-demand SIB after being updated on the inter-base station interface. Herein, the number of another gNBs (gNB X) may be one or may be plural. When the number is plural, one gNB (gNB A) may notify another gNBs (gNBs X) of the on-demand SIB of the one gNB (gNB A) by multicast at once or by unicast individually. Another gNB (gNB X) may be a gNB that manages a neighbor cell of the cell of the one gNB (gNB A). Another gNB (gNB X) may be a gNB that manages another cell belonging to a paging area (a RAN paging area or a tracking area) to which the cell of the one gNB (gNB A) belongs.

Another gNB (gNB X) that has acquired the on-demand SIB of the one gNB (gNB A) may compare the on-demand SIB of its own (gNB X) with the on-demand SIB of the one gNB (gNB A) and update the list such that the cell identifier of the cell of the one gNB (gNB A) is included in the applicable cell identifier list of the on-demand SIB, when the on-demand SIBs are the same.

(1.7) Modification Example 3

A modification example 3 of the first embodiment presumes a scenario where handover of a UE 100 is performed.

When a gNB 200 (controller 230) performs handover of the UE 100 from its own cell to another cell (neighbor cell) outside an applicable area, the gNB 200 provides the UE 100 with a handover command including an on-demand SIB (i.e., a neighbor cell on-demand SIB) provided by another cell. The UE 100 (controller 130) acquires the handover command including the neighbor cell on-demand SIB. Accordingly, the UE 100 can quickly acquire the neighbor cell on-demand SIB at the time of the handover.

As one example, a source gNB decides the handover of the UE 100 to a target cell (neighbor cell) and transmits a handover request to a target gNB. The handover request may include an on-demand SIB that the source gNB has already provided to the UE 100. The handover request may include an identifier of an on-demand SIB that the UE 100 requests to be provided. The handover request may include an identifier of an on-demand SIB that the UE 100 is interested in (see a modification example 4 of the first embodiment described later).

In response to the reception of the handover request, the target gNB transmits a handover response including a handover command to the source gNB. The handover command includes an on-demand SIB provided by the target gNB. The handover command may include an on-demand SIB requested by the UE 100. The handover command including the on-demand SIB (neighbor cell on-demand SIB) is provided to the UE 100 via the source gNB.

The modification example 3 of the first embodiment does not necessarily have to be premised on the operation according to the first embodiment. That is, the gNB 200 may perform the operation according to the modification example 3 of the first embodiment irrespective of whether or not the target cell is outside the applicable area of the on-demand SIB.

(1.8) Modification Example 4

In a modification example 4 of the first embodiment, a UE 100 (controller 130) may notify a gNB 200 of which SIB the UE 100 desires to acquire from on-demand SIBs (SIBs other than a minimum SIB).

Such notification (hereinafter referred to as "interest notification") may be included in a request signal (Other SIB request) requesting the provision of the on-demand SIB or may be a signal different from the request signal (Other SIB request). The interest notification may include the identifier of the SIB that the UE 100 desires to acquire. The contents of the interest notification may be accumulated and managed in a host network apparatus. The host network apparatus may be provided in a CN 300.

(1.9) Modification Example 5

In the above-described first embodiment, one example has been described where an applicable area of an on-demand SIB is constituted by one or a plurality of cells.

However, the applicable area of the on-demand SIB may be an area constituted by one or a plurality of paging areas (a RAN paging area, a tracking area, or the like). In this case, a list indicating the applicable area may include an identifier of one or a plurality of paging areas.

The applicable area of the on-demand SIB may be an area formed by one or a plurality of beams (antenna directional beam). A list indicating the applicable area may include one or a plurality of beam identifiers.

A gNB 200 may individually provide the UE 100 with a list in cell unit, a list in paging area unit, and a list in beam unit. The gNB 200 may provide/notify the UE 100 or another gNB 200 with/of an on-demand SIB in cell unit, an on-demand SIB in paging area unit and an on-demand SIB in beam unit.

(1.10) Modification Example 6

In the above-described first embodiment, a scenario where a center node exists is not particularly mentioned.

The center node may be part of a gNB 200. As one example, a protocol stack of the gNB 200 may be separated by the lower layer and the upper layer, and the center node may be in charge of the upper layer. The center node may control a plurality of entities in charge of the lower layer. The plurality of entities may be recognized as a plurality of cells from the viewpoint of the UE 100. With such configuration, the center node may notify each of the plurality of entities of on-demand SIBs of other entities.

The center node may be an entity different from the gNB 200. The center node may control the plurality of gNBs 200. With such configuration, the center node may notify each of the plurality of gNBs 200 of the on-demand SIB of another gNB 200.

(2) Second Embodiment

Differences from the first embodiment will mainly be described in a second embodiment.

In a UE 100 according to the second embodiment, a controller 130 notifies a gNB 200 of a parameter for the gNB 200 to determine whether the gNB 200 should provide an on-demand SIB by either unicast or broadcast.

In the second embodiment, the controller 130 includes the parameter in a request signal (Other SIB request) requesting the provision of the on-demand SIB. The parameter may be at least one of information indicating that the UE 100 desires unicast, information indicating that the UE 100 desires broadcast, information indicating the degree of urgency to acquire the on-demand SIB, or a QoS-related parameter. When one request signal (Other SIB signal) can request a plurality of SIBs, the parameter may be set for each SIB requested to be provided. As one example, a list of identifiers of SIBs requested to be provided and a parameter associated with each identifier are included in the request signal (Other SIB request).

In the gNB 200 according to the second embodiment, a controller 230 acquires, from the UE 100, a parameter to determine whether the controller 230 should provide the on-demand SIB by either unicast or broadcast and determines, based on the parameter, whether to provide the on-demand SIB by either unicast or broadcast.

FIG. 7 is a diagram illustrating one example of an operating sequence according to the second embodiment.

As illustrated in FIG. 7, in Step S201, the UE 100 detects that it is necessary to acquire the on-demand SIB (Other SIB). As one example, the UE 100 detects that its upper layer (an application layer or the like) requests use of a specific service. The specific service is a service related to the on-demand SIB (Other SIB).

In Step S202, the UE 100 determines whether or not to acquire the on-demand SIB in a shorter time than a defined time for the specific service. The defined time may be the time set by the gNB 200, the time until transmission opportunity of the next on-demand SIB, or the application access request time. The determination may be made according to the notification from the upper layer (NAS, application) without setting the defined time.

When Step S202 is "Yes," the UE 100 transmits a request signal (Other SIB request), which indicates that the on-demand SIB should be provided by unicast, to a gNB 200-1 (Step S203). As one example, the UE 100 includes information indicating that the degree of urgency is high or QoS information indicating high QoS in the request signal (Other SIB request). The QoS information is information related to QoS and is, for example, a core network slice ID, a session ID, an allocated bearer ID, allowable waiting time (allowable latency), a QoS class identifier (QCI), and the like. The core network slice is a virtual entity set in a CN 300. When a request signal indicating that the on-demand SIB should be provided by unicast (i.e., a request signal for fast access) and a request signal indicating that the on-demand SIB should be provided by broadcast (i.e., a request signal for delay allowance access) are separately defined, the UE 100 may transmit the request signal for fast access. In response to the reception of the request signal (Other SIB request) indicating that the on-demand SIB should be provided by unicast, the gNB 200 provides the UE 100 with the on-demand SIB by unicast (Step S205).

On the other hand, when Step S202 is "NO", the UE 100 transmits a request signal (Other SIB request), which indicates that the on-demand SIB should be provided by broadcast, to the gNB 200-1 (Step S204). As one example, the UE 100 includes information indicating that the degree of urgency is low or QoS information indicating low QoS in the request signal (Other SIB request). When the request signal for fast access and the request signal for delay allowance access are separately defined, the UE 100 may transmit the request signal for delay allowance access. In response to the reception of the request signal (Other SIB request) indicating that the on-demand SIB should be provided by broadcast, the gNB 200 provides the UE 100 with the on-demand SIB by broadcast (Step S206).

(3) Other Embodiments

The present disclosure is not limited to the case where each of the above-described embodiments is separately and independently carried out, and two or more embodiments may be combined to be carried out. For example, part of the operation according to one embodiment may be added to other embodiments. Part of the operation according to one embodiment may be replaced with part of the operation of other embodiments.

In each of the above-described embodiments, the 5G mobile communication system has been exemplified as a mobile communication system. However, the present disclosure is not limited to the 5G mobile communication system, and the present disclosure may be applied to the LTE system and other systems.

The invention claimed is:

1. A user equipment comprising:
a processor and a memory, the processor configured to
receive a first system information block (SIB) that is broadcast from a first cell and includes information necessary for accessing the first cell,
receive a second SIB other than the first SIB from the first cell in response to a request transmitted by the user equipment for the second SIB,
receive and store in the memory first area information from the first cell, the first area information indicating a first area where the second SIB is applicable, the first area comprising a plurality of cells including the first cell,
when the user equipment camps on a second cell, receive from the second cell second area information indicating a second area to which the second cell belongs, and
determine whether to transmit a request for the second SIB to the second cell at least based on the stored first area information received from the first cell and the second area information received from the second cell.

2. An apparatus for controlling a user equipment, the apparatus comprising:
a processor and a memory, the processor configured to
receive a first system information block (SIB) that is broadcast from a first cell and includes information necessary for accessing the first cell,
receive a second SIB other than the first SIB from the first cell in response to a request transmitted by the user equipment for the second SIB,
receive and store in the memory first area information from the first cell, the first area information indicating a first area where the second SIB is applicable, the first area comprising a plurality of cells including the first cell,
when the user equipment camps on a second cell, receive from the second cell second area information indicating a second area to which the second cell belong, and determine whether to transmit a request for the second SIB to the second cell at least based on the stored first area information received from the first cell and the second area information received from the second cell.

3. A method used in a user equipment, the method comprising:

receiving a first system information block (SIB) that is broadcast from a first cell and includes information necessary for accessing the first cell, receiving a second SIB other than the first SIB from the first cell in response to a request transmitted by the user equipment for the second SIB, receiving and storing in memory first area information from the first cell, the first area information indicating a first area where the second SIB is applicable, the first area comprising a plurality of cells including the first cell, when the user equipment camps on a second cell, receiving from the second cell second area information indicating a second area to which the second cell belong, and determining whether to transmit a request for the second SIB to the second cell at least based on the stored first area information received from the first cell and the second area information received from the second cell.

* * * * *